(12) United States Patent
Crandall et al.

(10) Patent No.: US 8,445,601 B2
(45) Date of Patent: May 21, 2013

(54) POLYMERIC COMPOSITIONS AND METHOD OF MAKING AND ARTICLES THEREOF

(75) Inventors: Michael D. Crandall, North Oaks, MN (US); Yvan A. Bogaert, Ghent (BE); Aron Y. Goodner, Minneapolis, MN (US); Werner M. A. Grootaert, Oakdale, MN (US); Anthony P. Manzara, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 973 days.

(21) Appl. No.: 12/271,222

(22) Filed: Nov. 14, 2008

(65) Prior Publication Data

US 2010/0125120 A1   May 20, 2010

(51) Int. Cl.
*C08C 19/22*   (2006.01)

(52) U.S. Cl.
USPC ............... 525/376; 525/328.1; 525/328.4; 525/330.3; 525/330.5

(58) Field of Classification Search
USPC .......... 525/328.1, 328.4, 330.3, 330.5, 376
See application file for complete search history.

(56) References Cited

U.S. PATENT DOCUMENTS

| | | | |
|---|---|---|---|
| RE24,906 E | 12/1960 | Ulrich | |
| 4,277,593 A | 7/1981 | Scheve | |
| 5,681,904 A | 10/1997 | Manzara | |
| 6,491,903 B1 | 12/2002 | Forster et al. | |
| 2005/0096454 A1* | 5/2005 | Emrick et al. | 528/425 |
| 2010/0098761 A1* | 4/2010 | Song et al. | 424/486 |
| 2010/0159011 A1* | 6/2010 | Lian et al. | 424/487 |

FOREIGN PATENT DOCUMENTS

| | | |
|---|---|---|
| EP | 0 633 280 | 1/1995 |
| WO | WO 2006/060556 | 6/2006 |
| WO | WO 2007/035296 | 3/2007 |
| WO | 2008/048733 | 4/2008 |

OTHER PUBLICATIONS

Binder, W.H.; Sachsenhofer, R.; Macromolecular Rapid Communication, 2007, vol. 28, p. 15-54.*
Lutz, J.F.; Angewante Chemie International Edition, 2008, vol. 47, p. 2182-2184.*
Johnson, J.A., et al., "Synthesis of Degradable Model Networks via ATRP and Click Chemistry," *Journal of the American Chemical Society*, vol. 128 (2006) p. 6564-6565.
Meldal, M. and Christian W. Tornoe, "Cu-Catalyzed Azide—Alkyne Cycloaddition," *Chemical Reviews*, vol. 108 (2008) p. 2952-3015.
PCT Search Report and Written Opinion, PCT/US2009/063952, dated Jun. 17, 2010.
White, M. A., et al., "Toward the Syntheses of Universal Ligands for Metal Oxide Surfaces: Controlling Surface Functionality through Click Chemistry," *Journal of the American Chemical Society*, vol. 128 (2006) p. 11356-11357.
Katritzky, et al., *J. Poly. Sci.: Part A*, V. 46, pp. 238-256 (2008).
Keicher, et al., "Isocyanate-free curing of glycidyl-azide-polymer (GAP) with bi-propargyl-succinate", Fraunhofer ICT annual conference, Jun. 24-27 2008, Karlsruhe, Germany.
EP Extended Search Report, EP09826635.6, dated Mar. 16, 2012, 5 pages.

* cited by examiner

*Primary Examiner* — Robert Jones, Jr.
(74) *Attorney, Agent, or Firm* — Julie Lapos-Kuchar (57) ABSTRACT

Described herein are substantially linear copolymeric compositions having at least two azide groups and at least two non-activated acetylene groups. The azide groups and the non-activated acetylene groups are reacted to cure the substantially linear copolymer composition. Also, described are methods of making and using such substantially linear copolymeric compositions.

11 Claims, 3 Drawing Sheets

Fig. 4

# POLYMERIC COMPOSITIONS AND METHOD OF MAKING AND ARTICLES THEREOF

TECHNICAL FIELD

A novel cure system is described using azide and non-activated acetylene. Polymeric compositions using this cure system are described as well as the methods of making and using such polymeric compositions. For example, this cure system may be used in pressure sensitive adhesive applications.

BACKGROUND

Acrylate pressure sensitive adhesives are well-known in the art. Ulrich (U.S. Pat. No. RE 24,906) describes alkyl acrylate copolymers, which comprise a major amount of C4 to C14 alkyl esters of acrylic acid monomers and a minor portion of a copolymerizable polar monomer such as acrylic acid. Such adhesives are widely popular due to their availability, their low cost, and their ability to provide the requisite fourfold balance of adhesion, cohesion, stretchiness, and elasticity known to be required for effective pressure sensitive adhesives.

The advantage of acrylic polymers as viscoelastic bases for pressure sensitive adhesives are well known in the art. U.S. Pat. No. RE 24,906 (Ulrich) cites many examples of these products. Initially, such compositions were made via solution polymerization. However, such methods of polymerization involved the use of large amounts of organic solvents, which may be undesirable for economic reasons.

The acrylic polymers must be in a form such that they can be coated or applied in a manner that is desirable, for example, a smooth and level coating on a film to make a tape. In this tailored structure, the polymer may lack properties for the end use such as cohesive strength, tensile strength, or modulus. To attain end use properties, cross-linking or curing is contemplated to decrease chain slippage when a stress is applied.

Current strategies to cross-link polymers in coating applications involve high energy processes such as e-beam, gamma, and ultraviolet irradiation. These processes are limited in depth of cross-linking when applied to thick layers of polymer, and use a high amount of energy.

Many of the chemical routes to cross-link polymers involve cures including polyisocyanates and polyaziridines. These cures have short pot lives, making it difficult to achieve a uniform coat before the cross-linking reaction occurs.

Recently, it has become known to form a 1,3-cyclo-addition of azides with terminal acetylene (also known as a 3+2 cycloaddition) using a copper catalyst at room temperature in what is known as a "click reaction". Katritzky, et al., in *J. Poly. Sci.: Part A*, v. 46, 238-256 (2008), describe the preparation and characterization of end-capped azides and alkynes, wherein the azides were combined in 1,3-dipolar cycloaddition reactions to form triazole linked polymers.

However, U.S. Pat. No. 5,681,904 (Manzara), has taught away from cross-linking azides with activated acetylene (i.e., acetylene linked directly to a carbonyl) because such reactions are relatively fast and would lead to a short pot life.

SUMMARY

There is a desire to identify a chemical route to cross-link polymers that limits energy usage, allows for long pot lives, and provides sufficient cross-linking.

As disclosed herein, the present disclosure provides the tailoring of polymeric performance in applications such as pressure sensitive adhesives, films, and coatings. Further, the cohesive strength, tensile, modulus, and adhesion performance also may be improved.

Briefly, in one embodiment, the present disclosure provides a composition comprising a substantially linear copolymer having at least two randomly distributed interpolymerized non-activated acetylene cure-site monomers and a curing agent, wherein the curing agent comprises at least two azide groups.

In another embodiment, a method is provided comprising providing a substantially linear copolymer having at least two randomly distributed interpolymerized non-activated acetylene cure-site monomers and cross-linking with a curing agent, wherein the curing agent comprises at least two azide groups.

In yet another embodiment, an article is provided comprising a composition comprising a substantially linear copolymer having at least two randomly distributed interpolymerized non-activated acetylene cure-site monomers and a curing agent, wherein the curing agent comprises at least two azide groups.

In yet another embodiment, a composition is provided comprising a substantially linear copolymer having at least two randomly distributed interpolymerized azide cure-site monomers and a curing agent, wherein the curing agent comprises at least two non-activated acetylene groups.

In another embodiment, a method is provided comprising providing a composition comprising a substantially linear copolymer having at least two randomly distributed interpolymerized azide cure-site monomers and cross-linking with a curing agent, wherein the curing agent comprises at least two non-activated acetylene groups.

In yet another embodiment, a composition is provided comprising a substantially linear copolymer having, on the polymer backbone, at least one randomly distributed interpolymerized azide cure-site monomer and at least one randomly distributed interpolymerized non-activated acetylene cure-site monomer.

In another embodiment, a method is provided comprising providing a substantially linear copolymer having, on the polymer backbone, at least one randomly distributed interpolymerized azide cure-site monomer and at least one randomly distributed interpolymerized acetylene cure-site monomer and cross-linking.

In yet another embodiment, an article is provided comprising a substrate and a polymer layer wherein the polymer layer comprises: i) a substantially linear, randomly copolymerized polymer, ii) at least two azide groups, and iii) at least two non-activated acetylene groups, wherein at least one of ii) or iii) is bonded to the substantially randomly copolymerized polymer; and wherein the polymer layer is cross-linked by reacting the at least two azide groups and the at least two non-activated acetylene groups.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B);

"cross-linking" refers to connecting two pre-formed polymer chains using chemical bonds or chemical groups in order to increase the modulus of the material;

"cure-site" refers to functional groups, which may be pendant from any monomer unit and may participate in cross-linking;

"end-capped" refers to polymers that have been made or modified by positioning a specific group at the end(s) of the polymer chain, which can then be used for subsequent reactions to increase chain length;

"interpolymerized" refers to monomers that are polymerized together to form a polymer backbone; and "(meth)acrylate" refers to compounds containing either an acrylate ($CH_2$=CHCO$^-$) or a methacrylate ($CH_2$=CCH$_3$CO$^-$) structure or combinations thereof.

Also herein, recitation of ranges by endpoints includes all numbers subsumed within that range (e.g., 1 to 10 includes 1.4, 1.9, 2.33, 5.75, 9.98, etc.).

Also herein, recitation of integer ranges by endpoints includes all integers subsumed within that range (e.g., 1 to 10 includes 1, 2, 3, 4, 5, etc.).

Also herein, recitation of "at least two" includes all numbers of two and greater (e.g., at least 4, at least 6, at least 8, at least 10, at least 25, at least 50, at least 100, etc.).

Also herein, recitation of "at least one" includes all numbers of one and greater (e.g., at least 2, at least 4, at least 6, at least 8, at least 10, at least 25, at least 50, at least 100, etc.).

This disclosure provides an azide-acetylene cure system for polymers. Although not wanting to be bound by theory, it is believed that the non-activated acetylene and the azide react in a 3+2 cycloaddition to form a 1,2,3-triazole.

As disclosed herein, an azide-acetylene cure system refers to the use of azide groups and non-activated acetylene groups to cross-link polymer chains. At least three embodiments of the azide-acetylene cure system are contemplated in this disclosure. In one embodiment, the substantially linear copolymer comprises randomly distributed interpolymerized monomers comprising a non-activated acetylene cure-site and the curing agent comprises at least two azide groups. In another embodiment, the substantially linear copolymer comprises randomly distributed interpolymerized monomers comprising an azide cure-site and the curing agent comprises at least two non-activated acetylene groups. In another embodiment, a substantially linear copolymer comprising, on the substantially linear copolymer backbone, at least one randomly distributed interpolymerized azide cure-site monomer and at least one randomly distributed interpolymerized acetylene cure-site monomer.

A non-activated acetylene group, as disclosed herein, means that the acetylene in the substantially linear copolymer or the curing agent is connected via an aliphatic carbon group, —$CR_2$—, where R is independently H or a non-interfering organic group, i.e., R does not sterically or electronically hinder the acetylene group from cycloadding to the azide. R may be hydrogen, deuterium, a small alkyl group, and so forth. The non-activated acetylene group does not have a carbonyl group linked directly to the carbon atom of the acetylene. In other words, the non-activated acetylene is not —C(=O)—C≡C—.

The polymers contemplated in this disclosure are substantially linear copolymers. Substantially linear means that the copolymer is a linear polymer that may comprise light to moderate branching, but that the copolymer is not a highly-branched (e.g., dendritic) polymer. Quantitatively, substantially linear refers to less than ten branches for every 100 monomer units in the polymer backbone, less than five branches for every 100 monomer units in the polymer backbone, or even one branch for every 100 monomer units in the polymer backbone. The substantially linear copolymers of this disclosure may be randomly (e.g., free radically) polymerized. By copolymer is meant herein a polymer comprising at least two different interpolymerized monomers (i.e., the monomers not having the same chemical structure) and include: terpolymers (comprising three different monomers), tetrapolymers (comprising four different monomers), etc.

In some embodiments, the substantially linear copolymer is hydrophilic. In some embodiments, the substantially linear copolymer is hydrophobic. In some embodiments, the substantially linear copolymer has a number average molecular weight (Mn) of at least 50,000 dalton, at least 100,000 dalton, at least 300,000 dalton, at least 500,000 dalton, at least 750,000 dalton, at least 1,000,000 dalton, or even at least 1,500,000 dalton.

The substantially linear copolymer may comprise interpolymerized monomers of (meth)acrylate, such as (meth)acrylate ester monomers, (meth)acrylate amide monomers, or (meth)acrylic acid monomers.

(Meth)acrylate ester monomers may include the esters of either acrylic acid or methacrylic acid with non-tertiary alcohols such as methanol, ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 3,7-dimethylheptanol, 3,7-dimethylhept3-eneol, 1-decanol, 1-dodecanol, 1-tridecanol, 1-tetradecanol, citronellol, dihydrocitronellol, 1-octadecanol, and the like.

(Meth)acrylate amide monomers may include: acrylamide with or without additional organic groups instead of hydrogen on the nitrogen atom, and methacrylamide with or without additional organic groups instead of hydrogen on the nitrogen atom. The organic groups may include: alkyl, aryl, alkaryl, hydroxyl, amine, ammonium, ether, ester, urethane, or other groups.

(Meth)acrylic acid monomers may include acrylic acid or methacrylic acid or their salts.

The (meth)acrylate monomer may be present in an amount of 80 to 99 parts by weight based on 100 parts total monomer content used to prepare the substantially linear copolymer. Preferably (meth)acrylate monomer may be present in an amount of 90 to 95 parts by weight based on 100 parts total monomer content. (Meth)acrylates may make up most of the substantially linear copolymer backbone and are also the comonomers, which are used to incorporate the azide cure-site or non-activated acetylene cure-sites into the substantially linear copolymer.

In one embodiment of the azide-acetylene cure system, a curing agent comprising at least two azide groups is added to a substantially linear polymer comprising at least two randomly distributed non-activated acetylene groups.

The azide compound used as the curing agent comprises at least two azide groups (i.e., at least two $N_3$ groups). The azide compound used as the curing agent may be of the formula: $G(N_3)_m$ where m is an integer from 2 to about 10 and G is a m-valent organic group, where at least two of the azide ($N_3$) groups are connected via aliphatic carbon atoms, where G may contain other non-interfering organic groups such as alkyl, aryl, alkaryl, hydroxyl, halogens, amine, ammonium, ether, ester, urethane, or other groups that do not interfere with the desired reaction. The azide compound used as the curing agent may be of low molecular weight such as compounds having a molecular weight of less than 1,000, oligomers between 1,000 and 20,000 molecular weight, or polymers with greater than 20,000 molecular weight. Examples of an azide compound used as the curing agent include, but are not limited to: $CH_3CH_2C(OCH_2CH\text{---}OHCH_2N_3)_3$, $N_3CH_2CH_2O[CH_2CH(CH_2N_3)O]_6CH_3$, $CH_3CH_2C[CH_2(OCH_2CH(CH_2N_3))_2OCOCH_3]_3$, $CH_3CH_2C[CH_2(OCH_2CH(CH_2N_3))_2OH]_3$, $N_3CH_2CH_2OCH_2CH(OH)CH_2N_3$, poly-urethane of $N_3CH_2CH_2OH$ with polyisocyanate, tris-2-azido-ethyl trimesoate, hexane-1,6-bis-azidoethyl-urethane, polyoxyethylene bis(azide), bis-azide dye, 1,8-diazidooctane, and combinations thereof. Other polyazide compounds are contemplated in this disclosure including those which contain more than 46% by weight nitrogen.

In one embodiment, the azide compound used as the curing agent is stable (i.e., it does not lose molecular nitrogen to form a nitrene) under the cross-linking conditions (e.g., temperature and time) needed to change the mechanical properties of the polymer.

The non-activated acetylene group of the interpolymerized non-activated acetylene cure-site monomer may be incorporated into the substantially linear copolymer during polymerization by use of a non-activated acetylene-containing monomer or by a post-polymerization reaction step. However, other methods of introduction are also contemplated by this disclosure. Examples of a non-activated acetylene-containing monomer include, but are not limited to: propargyl(meth)acrylate, and the propargyl ether of 4-vinyl phenol. Post-polymerization reactions are described below.

The substantially linear copolymer must contain a sufficient quantity of non-activated acetylene groups that can act as cure-sites for cross-linking. The amount of non-activated acetylene-containing cure-sites in a side chain position of the substantially linear copolymer generally is from about 0.01 to about 5 mole percent or even from 0.05 to 3 mole percent relative to the substantially linear copolymer. However, not all of the non-activated acetylene cure-sites need to be reacted as long as the desired end properties are achieved.

Examples of monomers useful in preparing the substantially linear copolymers comprising the interpolymerized non-activated acetylene cure-site monomers include (meth)acrylate ester monomers, (meth)acrylate amide monomers, and (meth)acrylate acid monomers as discussed above.

In another embodiment of the azide-acetylene cure system, a curing agent comprising at least two non-activated acetylene groups is added to a substantially linear polymer comprising at least two randomly distributed azide groups.

The non-activated acetylene compound used as the curing agent comprises at least two non-activated acetylene groups. The non-activated acetylene compound used as the curing agent may contain other non-interfering organic groups (such as alkyl, aryl, or alkaryl, which may contain hydroxyl, halogen, ionic, amine, ammonium, ether, urethane, or other groups that do not interfere with the desired reaction). The non-activated acetylene compound used as the curing agent may be of low molecular weight such as compounds having a molecular weight of less than 1,000, oligomers between 1,000 and 20,000 molecular weight or polymers with greater than 20,000 molecular weight.

Examples of non-activated acetylene compounds used as curing agents include, but are not limited to: tris propargyl trimesoate, trimethyladipoyl-bis-propargylate, 1,7-octadiyne, bis-propargyl urethanes, poly-propargyl urethanes, and combinations thereof.

The azide group of the interpolymerized azide cure-site monomer may be of the formula: $P\text{---}R\text{---}N_3$ where R is an organic group (such as alkyl or aralkyl, which may contain, hydroxyl, amine, ammonium, ether, ester, urethane, or other groups that do not interfere with the desired cross-linking reaction), which connects the azide group to the substantially linear copolymer backbone and P is the substantially linear copolymer backbone, where the substantially linear copolymer backbone may carry other non-interfering organic groups (such as alkyl, aryl, or alkaryl, which may contain ionic, halogen, hydroxyl, amine, ammonium, ether, ester, urethane, or other groups that do not interfere with the desired cross-linking reaction).

The azide group of the interpolymerized azide cure-site monomer may be incorporated into the substantially linear copolymer during polymerization by use of an azide-containing monomer or by a post-polymerization reaction step. However, other methods of introduction are also contemplated by this disclosure.

Examples of an azide-containing monomer include, but are not limited to: azidoethyl methacrylate, azidopropyl methacrylate or other free-radical polymerizable monomers, wherein the polymerizable bond does not react with the azide group during monomer synthesis or polymerization. Post-polymerization reactions are described below.

Post-polymerization reactions may be used to incorporate or unblock the active cure-sites, as long as the cure-site functional group (either the azide or the non-activated acetylene) does not interfere with the post-polymerization reaction. The azide group or non-activated acetylene group, or a compound containing such group, may be attached to the substantially linear copolymer via direct esterification, transesterification, transamidation of esters, direct amidation, urethane formation, epoxy ring opening, aziridine ring opening, salt formation, nucleophilic displacement, amine quaternization, and other methods known to those skilled in the art. An example of a post-polymerization reaction involving an unblocking technique is the use of trimethylsilylpropargylmethacrylate or trimethylsilylpropargylacrylate where the trimethyl silyl group is removed after polymerization. Another example of a post-polymerization reaction includes the reaction of a compound comprising the cure-site functional group and an aziridine group. This compound can react with the carboxylic acid groups on the (meth)acrylate copolymer to link the cure-site functional group to the substantially linear copolymer backbone. Similarly, silanes may also be used in post-polymerization reactions to link the cure-site functional group to the substantially linear copolymer backbone. Examples of such silanes include, but are not limited to: 3-azidopropryl triethoxysilane, silanesulfonyl azide, and 6-azidosulfonyl hexyl triethoxysilane.

The substantially linear copolymer must contain a sufficient quantity of azide groups that can act as cure-sites for cross-linking. The amount of azide-containing cure-sites in a side chain position of the substantially linear copolymer generally is from about 0.01 to about 5 mole percent or even from 0.05 to 3 mole percent relative to the substantially linear copolymer. However, not all of the azide cure-sites need to be reacted, as long as the desired end properties are achieved.

Examples of monomers useful in preparing the substantially linear copolymer comprising the interpolymerized azide cure-site monomers include the methacrylate ester monomers, methacrylate amide monomers, and methacrylate acid monomers as described above.

In another embodiment of the azide-acetylene cure system, the substantially linear copolymer comprises at least one randomly distributed interpolymerized azide cure-site monomer and at least one randomly distributed interpolymerized non-activated acetylene cure-site monomer. The interpolymerized azide cure-site monomers and the interpolymerized non-activated acetylene cure-site monomers include those as described above.

An example of such an embodiment is copolymerizing azidoethyl methacrylate and propargyl methacrylate with other (meth)acrylate monomers. Other free-radically polymerizable monomers may also be used as long as they do not react with the azide group or the non-activated acetylene group under the polymerization conditions. The incorporation of both the azide and the non-activated acetylene into the same substantially linear copolymer enables the cross-linking of the substantially linear copolymer without the need for additional curing agents. Such a strategy eliminates errors that might be made in the subsequent formulation of the substantially linear copolymer due to mischarging of the low levels of curing agent. With this strategy there is less of a possibility of curing agent loss due to thermal vaporization and, when applying the composition to a substrate, there is less of a possibility that the curing agent will diffuse into the substrate or adjacent layers before and during cross-linking.

In yet a further embodiment of this disclosure, using similar chemistry as described above, a compound comprising a functional entity and at least one pendant non-activated acetylene group or azide group may be added to the disclosures disclosed herein. In another embodiment, the curing agent may be a compound comprising a functional entity and at least two pendant non-activated acetylene groups or azide groups.

The functional entities may include a chemical group, which interacts with the environment in a useful way. For example, the functional entity may: absorb light (such as a dye), modify light (such as a polarizer, photoinitiator, etc.), act as a photostabilizer, act as an antioxidant, provide a self-healing property, act as a free-radical initiator, lower the surface energy, act as an identifiable marker, provide hydrophilicity or hydrophobicity, absorb and/or emit electric or magnetic field energy, degrade or decompose under controlled conditions, modify adhesion, soften or stiffen a material, etc.

Dyes, for examples, are known to those skilled in the art and can readily be classified by chemical structure, e.g., azo dyes (strong and cost-effective) and anthraquinone dyes (weak and expensive). The types of dyes useful for this disclosure include those that are readily modified to include the azide group or the non-activated acetylene group.

The compound comprising a functional entity and at least one pendant non-activated acetylene group or azide group can be added to the composition before cross-linking, for example when compounding the substantially linear copolymer and the curing agent. Then during cross-linking, the pendant azide group (or non-activated acetylene group) of the compound comprising the functional entity would react with the non-activated acetylene group (or the azide group) of the substantially linear copolymer as disclosed above to covalently bond the functional entity into the polymer. For example, a compound with a functional entity and a pendant azide group would react with the interpolymerized non-activated acetylene cure-site monomer of the substantially linear copolymer to covalently bond the functional entity to the substantially linear copolymer through a triazole linkage. The same techniques could be used to anchor a functional entity to a finished adhesive or coating, for example in an image-wise fashion, to create patterns of different properties (e.g., color).

In the embodiments described above, the amount of non-activated acetylene to azide generally is in a ratio of 1:1 or higher. However, the amount may be less than 1:1 so as long as there is a sufficient number of azide-acetylene cross-links to achieve cross-linking. It is acceptable to leave some of the non-activated acetylene groups or some of the azide groups unreacted if the desired mechanical properties can be achieved.

When employing the azide-acetylene cure systems described above, a dispersing agent such as a hydrocarbon, ester (e.g., ethyl acetate), ketone (e.g., methyl ethyl ketone), or other solvent in which both the substantially linear copolymer and the curing agent are soluble, may be necessary to ensure homogeneous dispersion of the curing agent in the substantially linear copolymer.

Additional monomers also may be included, such as described below, to provide particular properties. For example, acid-functionalized monomers or polar monomers.

The acid functional monomer, where the acid functional group may be an acid per se, may include carboxylic acid, or a portion may be a salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and combinations thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropane-sulfonic acid, vinylphosphonic acid, and combinations thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 1 to 15 parts by weight, preferably 1 to 5 parts by weight, based on 100 parts by weight total monomer.

Polar comonomers may also be included to impart useful properties in the substantially linear copolymer, such as resistance to oils, adherence to low surface energy substrates, and the like.

Examples of useful polar copolymerizable monomers include, but are not limited to those selected from the group consisting of acrylic acid, methacrylic acid, itaconic acid, hydroxyalkyl acrylates, styrene sulfonic acid and its sodium salt, maleic acid, fumaric acid, citraconic acid, acrylamides, substituted acrylamides, N-vinyl lactams such as N-vinylpyrrolidone, N-vinylcaprolactam, acrylonitrile, dimethylamino ethylmethacrylate, and combinations thereof. Polar copolymerizable monomers include those selected from the group consisting of acrylic acid, methacrylic acid, acrylamides, substituted acrylamides, and combinations thereof, for reasons of availability and influence on polymer properties.

Representative examples of suitable polar monomers include, but are not limited to 2-hydroxyethyl(meth)acrylate;

N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and combinations thereof. Preferred polar monomers include those selected from the group consisting of 2-hydroxyethyl(meth) acrylate and N-vinylpyrrolidinone. The polar monomer may be present in amounts of 0 to 10 parts by weight, preferably 1 to 5 parts by weight, based on 100 parts by weight total monomer.

When used, vinyl monomers useful in the substantially linear copolymer include but are not limited to: vinyl esters (e.g., vinyl acetate, vinyl propionate, and vinyl butyrate), styrene, substituted styrene (e.g., α-methyl styrene), vinyl halide, and combinations thereof. A preferred monomer with a high Tg (glass transition temperature) is vinyl acetate for reasons of availability. Such vinyl monomers are generally used at 0 to 5 parts by weight, preferably 1 to 5 parts by weight, based on 100 parts by weight total monomer.

When employing the azide-acetylene cure systems described above, other curing agents, such as azirdine amide, may be added to the substantially linear copolymer for cross-linking. However, care must be taken to select the additional curing agents so that they do not react with the azide groups or non-activated acetylene groups prior to the azide-non-activated acetylene cure. For example, when using substantially linear copolymers comprising interpolymerized azide cure-site monomers, some of the additional curing agents mentioned below will react with the azide group before the azide-acetylene cure. In the case of a substantially linear copolymer comprising interpolymerized azide cure-site monomers, some of the additional curing agents mentioned below would have to be used either before the azide is introduced or after the azide is reacted with the non-activated acetylene group. Examples of additional curing agents include, but are not limited to those selected from the group consisting of multifunctional acrylates such as diacrylates, triacrylates, and tetraacrylates, such as 1,6-hexanedioldiacrylate, poly(ethylene glycol)diacrylates, poly(butadiene)diacrylates, polyurethane diacrylates, and trimethylolpropane triacrylate; 4-acryloxybenzophenone; divinyl benzene; and combinations thereof. Preferred cross-linkers are those selected from the group consisting of 1,6-hexanedioldiacrylate (HDDA), poly(ethylene glycol)diacrylates, 4-acryloxybenzophenone, and combinations thereof for reasons of availability.

Additional curing agents also may be added to control the polymeric architecture allowing more freedom in attaining a specific desired performance. Additional curing agents, if included, are typically added in a range of about 0.01 to about 0.5 percent by weight, preferably about 0.02 to about 0.1 percent by weight, most preferably about 0.03 to about 0.08 percent by weight, based upon the total weight of monomer included.

The compositions can include any of the adjuvants commonly employed in curable polymer formulations. An organic or inorganic filler may be added to the composition to improve physical properties, such as tensile strength, density, and modulus. Fillers include: carbon black; silica; or other mineral fillers such as hydrotalcite, or barium sulfate, and combinations thereof.

In some embodiments tackifiers and plasticizers may also be added to the composition. Tackifiers, include for example, rosin, rosin derivatives, hydrogenated rosin derivatives, polyterpene resins, phenolic resins, coumarone-indene resins, poly-t-butyl styrene and combinations thereof. Plasticizers include for example, hydrocarbon oils, hydrocarbon resins, polyterpenes, rosin esters, phthalates, phosphate esters, dibasic acid esters, fatty acid esters, polyethers, and combinations thereof.

Other optional additives include, for example, stabilizers (e.g., antioxidants or UV-stabilizers), pigments (e.g., dyes), flame retardants, medicaments, and the like. The use of such additives is well known to those of ordinary skill in the art.

Fibers, glass bubbles, and retro-reflective beads may also be added. Fibers can be of several types, generally polymeric or glass. The former can be nylon, polyester, polyamide, epoxy and the like. Glass fibers fall into two types E- and S-glass. E-glass has good insulation properties and maintains its properties up to 1500° F. (815° C.). S-glass has a high tensile strength and is stiffer than E-glass. The fiber type is chosen for its compatibility with the substantially linear copolymer and to provide enhanced properties such as tensile and elongation. Glass bubbles are generally used to lower density, add topology to the substantially linear copolymer coatings or films, reduce cost, and/or to control contact area. A series of glass microbubbles with variation in size and crush strength is available from 3M Co., St. Paul, Minn. In pressure sensitive adhesives, glass bubbles offer the ability to control the initial adhesion by reducing contact until the bubbles are crushed by force and allowing full contact of the adhesive layer.

The curable composition can typically be prepared by mixing one or more substantially linear copolymer(s), the curing agent (if needed), any additional curatives (if desired), and any adjuvants (if desired) in conventional processing equipment. This may be done in a solvent or in a solvent-less environment. The desired amounts of compounding ingredients and other conventional adjuvants or ingredients can be added to the curable composition and intimately admixed or compounded therewith by employing any of the conventional mixing devices such as extruders, static mixers, internal mixers, (e.g., Banbury mixers), two roll mills, or any other convenient mixing devices. The temperature of the mixture during the mixing process typically is kept safely below the cross-linking temperature of the composition. Thus, the temperature typically should not rise above about 60° C., about 80° C., or even about 100° C. During mixing, it generally is desirable to distribute the components and adjuvants uniformly.

In one embodiment of this disclosure, the compounded composition may be processed (such as by coating or molding) in a solvent or a solvent-less environment. For example, the azide-containing compound (e.g., the substantially linear copolymer comprising interpolymerized azide cure-sites) and the non-activated acetylene-containing compound (e.g., the curing agent) may be coated without the presence of a solvent, or may be coated in the presence of a solvent The solvent may be removed, for example, by thermal evaporation. Additionally, the amount of solvent in the compounded composition may be adjusted, depending on the application so as to obtain a desired viscosity of the composition. For example, in pressure sensitive adhesive applications, the viscosity may be adjusted to obtain a desired flow rate for the process.

In one embodiment of this disclosure, the compositions may be compounded and/or processed (such as by coating or molding) in the presence of water. Because the reaction of the azide group and the non-activated acetylene group is not sensitive to water, there may be no need to take special precautions to prevent moisture from being present. For example, there may be no need to dry fillers or other reactants, or control the humidity of the reaction atmosphere. Because of the water insensitivity, the substantially linear copolymers may be made in latex form and processed without the use of organic solvents, which may be environmentally advantageous.

The compounded compositions of this disclosure may be cross-linked via thermal activation. Thus, when the heat is removed, the composition does not further cure. Temperatures for cross-linking include those above 100° C. or even above 140° C. In some embodiments, a metal catalyst may not be used in the reaction of the azide with the non-activated acetylene. In some embodiments, a metal catalyst may be used to catalyze the azide-non-activated acetylene reaction. Examples of such metals catalysts include metal and metal salts such as those including: copper, nickel, palladium, and platinum.

In one embodiment, the compositions of this disclosure may be applied in adhesive or coating applications, or used as structural polymers, such as fiber reinforced composites, filled polymers, etc.

In coating applications, for example, a layer of the substantially linear copolymer comprising the azide-acetylene cure system is applied to a substrate to provide or modify the substrate's features such as color, adhesion, surface finish, surface energy, scratch resistance, abrasion resistance, chemical resistance, weatherability, and so forth.

In filled polymers, for example, a discontinuous material (e.g., filler) is incorporated into the matrix (e.g., the substantially linear copolymer comprising the azide-acetylene cure system) to provide features, advantages, and benefits above and beyond those available from each of the separate components. In reinforced composites, for example, fillers are added to the substantially linear copolymer comprising the azide-acetylene cure system to improve the mechanical properties of the substantially linear copolymer comprising the azide-acetylene cure system. In a structural article, a shaped piece of material, is added to the article to provide dimensional control of the article. A structural article may also be a unitary (non-assembled) item such as an injection-molded object like a comb, a hand-held magnifier, a concrete stop for a parking space, etc.

In one embodiment of this disclosure, the composition is used as an adhesive in, for example, a PSA (pressure sensitive adhesive).

The compositions prepared in accordance with the present disclosure are easily coated upon suitable flexible or inflexible backing materials by conventional coating techniques to produce adhesive coated sheet materials in accord with the present disclosure. The flexible backing material may be any material conventionally utilized as a tape backing or any other flexible material. Typical examples of flexible backing materials employed as conventional tape backings, which may be useful for the adhesive compositions of the present disclosure include those made of paper, plastic films such as polypropylene, polyurethane, polyethylene, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic material, and the like or nonwoven fabric such as air laid webs of natural or synthetic fibers or blends of these. The backing may also be formed of metal, metalized polymeric films, or ceramic sheet materials. The coated sheet materials may take the form of any article conventionally known to be utilized with PSA compositions such as labels, tapes, signs, covers, marking indicia, and the like.

These coated papers or thermoplastic films are often siliconized or otherwise treated to impart improved release characteristics. One or both sides of the backings or liners could have such release characteristics. Generally the backing or substrate material is about 50 μm (micrometer) to about 155 μm in thickness, although thicker and thinner backing or substrate materials are not precluded.

The PSA compositions of the present invention may be coated by any of a variety of conventional coating techniques known in the art, such as roll coating, spray coating, knife coating, extrusion, die-coating, and the like.

An advantage of using the composition of this disclosure is that a solvent-less adhesive or coating may be generated. Further, the cohesive strength, tensile, modulus, and adhesion performance of the adhesive also may be improved.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated. All materials are commercially available, for example from Sigma-Aldrich Corporation, St. Louis, Mo., or known to those skilled in the art unless otherwise stated or apparent.

These abbreviations are used in the following examples: g=grams, min=minutes, mol=mole; mmol=millimole, hr=hour, s=second, mm=millimeter, mL=milliliter, L=liter, FT-IR=Fourier transform infrared spectroscopy, and FT-NMR=Fourier transform nuclear magnetic resonance spectroscopy.

Rheometer Method

Using a stress-strain controlled rheometer, AR2000, (TA Instruments, New Castle, Del.) samples were placed between two 20 mm parallel plates. The bottom plate was heated to 160° C. and held at that temperature for the duration of the experiment. The top plate was oscillated with a frequency of 1 Hertz and strain of 1% of 2 mm to generate the elastic modulus of the test sample. Readings were taken every 30 s and recorded by a motor transducer attached to the top plate. Data was then stored as elastic modulus (G') in Pascals (Pa) vs. time in seconds (s) and plotted as G' versus time or log G' versus time.

Preparation of Reagents $CH_3CH_2C(OCH_2CH-OHCH_2N_3)_3$ was prepared as follows: Step 1—$CH_3CH_2C(CH_2OCH_2CHOHCH_2Cl_3)_3$ was prepared by melting a mixture of trimethylolpropane (134 g) and 1 g of $C_6H_5CH(SO_2CF_3)_2$ (made by reacting benzyl magnesium chloride with triflyl fluoride according to *Journal of Organic Chemistry*, 38, p. 3358, 1973) in a flask equipped with stirring bar and dropping funnel. The temperature was controlled at 70° C. while epichlorohydrin (277 g) was added over a period of two hours. Step 2—This tri-chloro compound (without purification) was converted to the tris-azide by adding it over a period of one hour to a hot solution (100° C.) of sodium azide (200 g) and sodium hydroxide (5 g) in water (500 g). The mixture was stirred for 10 hours at 100° C., then allowed to cool. The aqueous phase was separated from the product phase and extracted with ethyl acetate (500 g). The ethyl acetate phase was combined with the product phase and residual water was removed by azeotropic distillation. The dried product solution in ethyl acetate was filtered. The ethyl acetate was removed on a rotary evaporator with a water-aspirator vacuum and temperature bath. The product was a viscous yellow liquid. Structural confirmation was achieved by FT-IR spectroscopy.

PEG 1000 diazide was prepared as follows: 1000-Molecular weight polyethylene glycol (100 g) was melted at 60° C., stirred, and purged with nitrogen. Thionyl chloride (50 g) was added gradually allowing hydrogen chloride and sulfur dioxide to evolve. After obvious gas evolution was complete, the mixture was heated for an additional 16 hours until the hydroxyl peak in the infrared spectrum was eliminated. Excess thionyl chloride was removed by sparging with nitrogen until the effluent gas no longer created a white smoke with the fumes from a bottle of ammonium hydroxide. The resulting residue (20.4 g) was mixed with a solution of sodium azide (4 g) in water (120 g). This mixture was heated at 100° C. for 24 hours, then cooled and extracted twice with 100 mL toluene. Stripping the combined toluene phases left 15.0 g of poly(ethylene glycol)diazide, characterized by an infrared absorption for the azido group at 2103 $cm^{-1}$.

$N_3CH_2CH_2OCH_2CH(OH)CH_2N_3$ was prepared as follows: Step 1: 2-chloroethanol (1208 g), was mixed with $SnCl_4$ (11.6 g, 5.2 mL) in a 5 L, 3-necked flask and heated to 70° C. Epichlorohydrin (1112 g) was added over four hours at a rate to maintain the temperature in the range of 60° C.-75° C. After addition was complete, the reaction mixture was held at 70° C. for one hour, then was cooled to 30° C. and methylene chloride (1000 g) was added. A pre-dissolved mixture of ethylenediamine tetraacetic acid disodium salt (48 g), sodium hydroxide (9.2 g), and water (1000 g) was added and stirred for one hour, then allowed to separate. The lower (organic) phase was extracted with 1000 mL of water. The organic phase was distilled at atmospheric pressure to remove $CH_2Cl_2$. The product was distilled between 116° C. and 130° C. at 7 mm Hg, providing 1050 g of the desired adduct. Step 2: The product from Step 1 (200 g) was mixed with dimethyl sulfoxide (200 g) and water (14 g) in a 2 L, 3-neck flask and heated towards 90° C. Sodium azide (200 g) was added gradually beginning at 50° C. and continued as heating proceeded to 90° C. The addition took 30 min and the temperature was at 90° C. when addition was complete. The reaction was allowed to run for 7.5 hrs. Water (1000 mL) was added and the mixture was stirred for 15 min then transferred to a separatory funnel. It was convenient to let this mixture sit overnight before separating. Methylene chloride (200 g) was added to the product phase and then 200 mL deionized water. The phases then were separated. The organic phase was stirred for 30 min with 20 g anhydrous $NaSO_4$ then filtered into a 1000 mL 3-neck flask. The product was stripped using a water bath at 55° C., an aspirator, and a nitrogen purge for about 2 hours to yield 160 g of the desired di-azidoalcohol. Structural confirmation was achieved by FT-IR spectroscopy.

$N_3CH_2CH_2O[CH_2CH(CH_2N_3)O]_6CH_3$ was prepared as follows: The alcohol $N_3CH_2CH_2O[CH_2CH(CH_2N_3)O]_6H$ was prepared by the procedure used for $N_3CH_2CH_2OCH_2CH(OH)CH_2N_3$ (above) except that the mole ratio of epichlorohydrin to 2-chloroethanol was 6:1 in Step 1, the non-volatile product was used in Step 2 without distillation, and xylene was used instead of methylene chloride to dilute the azide compound before washing in Step 2. Structural confirmation was achieved by FT-IR spectroscopy. In a final step, the alcohol was converted to its methyl ether, $N_3CH_2CH_2O[CH_2CH(CH_2N_3)O]_6CH_3$, by mixing the alcohol (69.5 g) with dimethyl sulfate (25.2 g) then slowly adding 50% aqueous sodium hydroxide solution (25.6) over a period of 35 min with vigorous agitation while keeping the batch temperature near 30° C. using a cooling water bath. Excess dimethyl sulfate then was consumed by adding ammonium hydroxide (6.5 g) and stirring for an additional hour. The product was isolated by adding xylene (250 mL) to the mixture, and extracting three times with water (100 mL). The organic phase was stripped under vacuum (20 mm Hg and 80° C. bath temperature) to yield 65 g of product. Structure confirmation was by FT-IR spectroscopy.

$N_3CH_2CH_2OH$ (2-azidoethanol) was prepared by adding 2-chloroethanol (80.5 g, 1 mol) dropwise over 30 min to a 70° C. stirred solution of sodium azide (66.95 g, 1.03 mol, American Azide Corp., Las Vegas, Nev.) in deionized water with 1% wt sodium hydroxide (EMD, Gibbstown, N.J.). The reaction then was heated at 100° C. for 5 hrs. 2-Azidoethanol was extracted from the reaction mixture with toluene (EMD, Gibbstown, N.J.) and dried via azeotropic distillation of toluene and water. The dried solution was filtered, then toluene was removed on a rotary evaporator with water-aspirator vacuum and water-bath heating. Structural confirmation was achieved by FT-NMR and FT-IR spectroscopy. Yield was approximately 75%.

The poly-urethane of $N_3CH_2CH_2OH$ with polyisocyanate sold under the trade designation "DESMODUR" N3200 (Bayer MaterialScience LLC, Pittsburgh, Pa.) was prepared as follows. DESMODUR N3200 (9.56 g) was dissolved in toluene (50 g) and 2-azidoethanol (5.74 g) was added. Dibutyltin dilaurate (0.03 g) was added and the solution was heated at 85° C. for 1 hr. The solvent was removed on a rotary evaporator with a water-aspirator vacuum and water-bath heating. The structure was confirmed by FT-IR spectroscopy.

The tris-2-azido-ethyl trimesoate was prepared as follows: trimesoyl trichloride (26.6 g) was dissolved in toluene (400 mL) and azidoethanol (29.1 g) was added. Triethyl amine (30.3 g) was added gradually with stirring, keeping the temperature below 60° C. After stirring the mixture for an additional hour, it was washed four times with 100 mL water and filtered. The solvent was removed on a rotary evaporator with a water-aspirator vacuum and water-bath heating. The tris-2-azido-ethyl trimesoate was obtained as a liquid (45.2 g) that crystallized very slowly. The structure was confirmed by FT-IR Hexane-1,6-bis-azidoethyl-urethane was prepared as follows: hexamethylene diisocyanate (14 g) was dissolved in toluene (60 g) and 2-azidoethanol (16 g) was added. Dibutyltin dilaurate (0.015 g) was added and heated to 85° C. An exothermic reaction occurred and then the solution was allowed to cool. The solvent was removed on a rotary evaporator with a water-aspirator vacuum and water-bath heating. The structure was confirmed by FT-IR spectroscopy.

The 2,3-dicarboxy-1,4-diaminoanthraquinone-N-hydroxyethylimide was prepared as follows: Sulfuric acid (630 g) was placed in a 1 L 3-neck flask and was heated to 80° C. Because of the exothermic reaction the 1,4-diamino-2,3-anthroquinone dicarbonitrile (123.44 g, Aceto Corp. Lake Success, N.Y.) was added slowly. A water bath was used to maintain a reaction temperature of 140° C.-150° C. After completing the addition of the 1,4-diamino-2,3-anthroquinone dicarbonitrile, the reaction was held at around 150° C. for 1 hour. The reaction was then cooled to 40° C. Water (255.04 g) then was added to the flask and the mixture was cooled to room temperature. The mixture was filtered very slowly through a glass frit funnel and washed with water. The filtrite (residue) was crushed and air dried. The product yield was 175 g.

The hydroxyl form of 2,3-dicarboxy-1,4-diaminoanthraquinone-N-hydroxyethylimide was prepared as follows: 60 g of the blue dye intermediate (2,3-dicarboxy-1,4-diaminoanthraquinone-N-hydroxyethylimide, above) was mixed with 1,2-dichlorobenzene (320.42 g) and ethanolamine (26.629 g). The mixture was heated to 120° C. Some of the solvent (with a small amount of water) was distilled out of the mixture through a dean-stark trap. The temperature was gradually raised to 150° C. and held for three hours. The mixture was cooled to room temperature and methanol (500 mL) was stirred-in. The mixture was then filtered. The filtrite was mixed with 25 g concentrated hydrochloride in 500 g of water, stirred well, filtered and repeated. The filtrite was then mixed with 500 mL of methanol and stirred filtered. The filtrite was air dried.

An azido-dye compound was prepared as follows: The hydroxyl form of the blue dye 2,3-dicarboxy-1,4-diaminoanthraquinone-N-hydroxyethylimide (0.515 g) was mixed with excess thionyl chloride (20 mL) and refluxed overnight, then the excess thionyl chloride was removed by sparging. The solid residue was mixed with 1 g of sodium azide in 20 mL dimethyl sulfoxide and heated for 16 hrs. The reaction mixture was diluted with water (20 mL) and extracted three times with 100 mL of toluene, which formed a blue organic solution as an upper phase each time. The solvent was removed from the combined toluene extracts leaving a dark solid residue whose infrared spectrum (nujol mull) showed a strong peak for azide at 2102 $cm^{-1}$.

Propargyl methacrylate—A two-phase mixture of methacryloyl chloride (21 g), propargyl alcohol (11.2 g), and cyclohexane (100 mL) was stirred in a 250 mL flask. Triethyl amine (21.2 g) was added slowly to keep the mixture below reflux temperature, and a solid phase gradually formed. The mixture was allowed to stir for 16 hours, then washed three times with 100 mL of cold water to remove triethylammonium hydrochloride, leaving a yellow solution. 5 g of activated carbon sold under the trade designation "DARCO" (Norit Americas Inc., Marshall, Tex.) was stirred into the solution for 2 hours and then was filtered off. The cyclohexane was removed from the nearly-colorless solution via rotary evaporation with aspirator vacuum and a pot temperature of 40° C., leaving 18 g of pale oil, whose identity was confirmed by FT-IR peaks at 3297, 2931, 1726, 1678, and 1638 $cm^{-1}$.

2-Azidoethyl methacrylate—A mixture of methacryloyl chloride (21 g), 2-azidoethanol (17.5 g) and cyclohexane (100 mL) was stirred in a water-cooled jacketed flask and triethyl amine (21.2 g) was added gradually keeping the temperature below 15° C. The mixture was stirred two hours more and washed twice with 100 mL of water. The aqueous phases were combined and extracted with 100 mL of cyclohexane. The combined yellow cyclohexane phases were treated with DARCO (5 g) with stirring, then filtered. The solvent was removed on a rotary evaporator with water-aspirator vacuum and bath temperature of 35° C., leaving a non-volatile fraction of 18.15 g of very pale yellow monomer, characterized by FT-IR spectroscopy. Peaks at 2931, 2103, 1723, 1678, and 1639 $cm^{-1}$ support the proposed structure.

Non-activated acetylenic functional polymer A was prepared as follows: isooctyl acrylate (3M Co., St. Paul, Minn.), propargyl acrylate (GFS Chemicals Columbus, Ohio) and acrylic acid (Dow Chemical Midland, Mich.) were added in a ratio of 94:5:1.45% by weight solids of the mixture was added to ethyl acetate/isopropanol (70/30), 0.2% 2,2'-azobis(2-methylbutyronitrile) obtained under the trade designation "VAZO 67" (DuPont, Wilmington, Del.). The vessel was purged with nitrogen for 35 s at 1 L/min and then held for 24 hrs at 57° C.

Approximately 50 mg of the polymer solids was weighed and diluted in 10 mL of tetrahydrofuran (inhibited with 250 ppm butylated hydroxytoluene). The polymer solution was then run through a 0.45 micrometer syringe filter and analyzed by size exclusion chromatography.

The analysis was run on a Waters 717 Autosampler, 600 series pump chromatography system (Waters Corp., Milford, Mass.) with an evaporative light scattering detector (ACS Mass Detector, Model 950/14, Applied Chromatography Systems, Ltd., Cheshire, UK). A size exclusion chromatography column, PL-Gel-4, 300 mm×7.8 mm each ($10^4$, $10^3$, 500, 100 Å) (Varian, Palo Alto, Calif.) was used and held at 60° C. during analysis. The injection size was 100 microliters. The mobile phase was tetrahydrofuran (EMD OmniSolv Grade or equivalent, uninhibited, EMD Chemicals, Gibbstown, N.J.) used at a flow rate of 1.0 mL/min.

Molecular weight values were determined by calibrating the system against narrow dispersity molecular weight polystyrene standards (from 377, 400-580 Mp (peak molecular weight), Varian, Palo Alto, Calif.). The acetylenic functional polymer sample was fitted using a $3^{rd}$ order polynomial fit to determine the molecular weight. For the non-activated acetylenic functional polymer A, the weight average molar mass (Mw) was $2.831 \times 10^5$, the number average molar mass (Mn) was $6.347 \times 10^4$, the average molar mass (Mz) was $8.236 \times 10^5$, and the polydispersity (Mw/Mn) was 4.46.

Non-activated acetylenic functional polymer B was prepared as follows: butyl methacrylate (Lucite International, Cordova, Tenn.), methyl methacrylate (Arkema Inc., Philadelphia, Pa.) and propargyl methacrylate (described above) were added in a ratio of 49:49:2.30% by weight solids of the mixture was added to ethyl acetate/isopropanol (99/1), and 0.2% VAZO 67. The vessel was purged with nitrogen for 35 s at 1 L/min and then held for 24 hrs at 57° C.

An azide functional polymer was prepared as follows: butyl methacrylate (Lucite International, Cordova, Tenn.), methyl methacrylate (Arkema Inc., Philadelphia, Pa.) and 2-azidoethyl methacrylate (described above) were added in a ratio of 49:49:2. To a 30% by weight solids of the mixture in ethyl acetate/isopropanol (99/1), 0.2% VAZO 67 was added. The vessel was purged with nitrogen for 35 s at 1 L/min and then held for 24 hrs at 57° C.

A polymer comprising a non-activated acetylenic functional group and an azide functional group was prepared as follows: butyl methacrylate (Lucite International, Cordova, Tenn.), methyl methacrylate (Arkema Inc., Philadelphia, Pa.), 2-azidoethyl methacrylate, and propargyl methacrylate were added in a ratio of 48:48:2:2. To 30% by weight solids of the mixture in ethyl acetate/isopropanol (99/1), 0.2% VAZO 67 was added. The vessel was purged with nitrogen for 35 s at 1 L/min and then held for 24 hrs at 57° C.

Trispropargyl trimesoate was made by dissolving trimesoyl trichloride (26.6 g) in 200 mL of toluene, then adding propargyl alcohol (17.2 g), and then adding 30.4 g of triethylamine in ten portions at a rate to keep the reaction temperature below 60° C. An additional 300 mL of toluene was added to allow the slurry to be stirred. The mixture was allowed to react for 4 more hours and then washed four times with 100 mL water. The organic phase then was filtered through a paper filter. The toluene was removed by rotary evaporation, leaving 31.7 g of a viscous oil, which gradually solidified and was characterized by FT-IR spectroscopy. Peaks at 3287, 2124, and 1732 $cm^{-1}$ support the proposed structure.

Examples

Example 1

To 1.10 g of the non-activated acetylenic functional polymer A, 0.01 g of $CH_3CH_2C(OCH_2CH(OH)CH_2N_3)_3$ was added. The sample was mixed, coated on liner, and air dried at room temperature for 24 hours.

Comparative Example 1 was prepared as Example 1 above, except no azide was added.

Example 2

To 2.2 g of non-activated acetylenic functional polymer A, 0.02 g of $N_3CH_2CH_2O[CH_2CH(CH_2N_3)O]_6CH_3$ was added. The sample was mixed, coated on liner, and air dried at room temperature for 24 hours.

Example 3

To 2.2 grams of non-activated acetylenic functional polymer A, 0.06 g of the PEG 1000 diazide was added. The sample was mixed, coated on liner, and air dried at room temperature for 24 hours.

Example 4

To 2.2 g of non-activated acetylenic functional polymer A, 0.02 g of $N_3CH_2CH_2OCH_2CH(OH)CH_2N_3$ was added. The sample was mixed, coated on liner, and air dried at room temperature for 24 hours.

Example 5

To 2.2 grams of non-activated acetylenic functional polymer A, 0.02 g of the poly-urethane of $N_3CH_2CH_2OH$ with polyisocyanate was added. The sample was mixed, coated on liner, and air dried at room temperature for 24 hours.

Example 6

To 2.2 g of non-activated acetylenic functional polymer A, 0.02 g of the tris-2-azido-ethyl trimesoate dissolved in 0.18 g of ethyl acetate was added. The sample was mixed, coated on liner, and air dried at room temperature for 24 hours.

Example 7

To 2.2 g of non-activated acetylenic functional polymer A, 0.02 g of the hexane-1,6-bis-azidoethyl-urethane dissolved in 0.27 g ethyl acetate was added. The sample was mixed, coated on liner, and air dried at room temperature for 24 hours.

Figure 1:
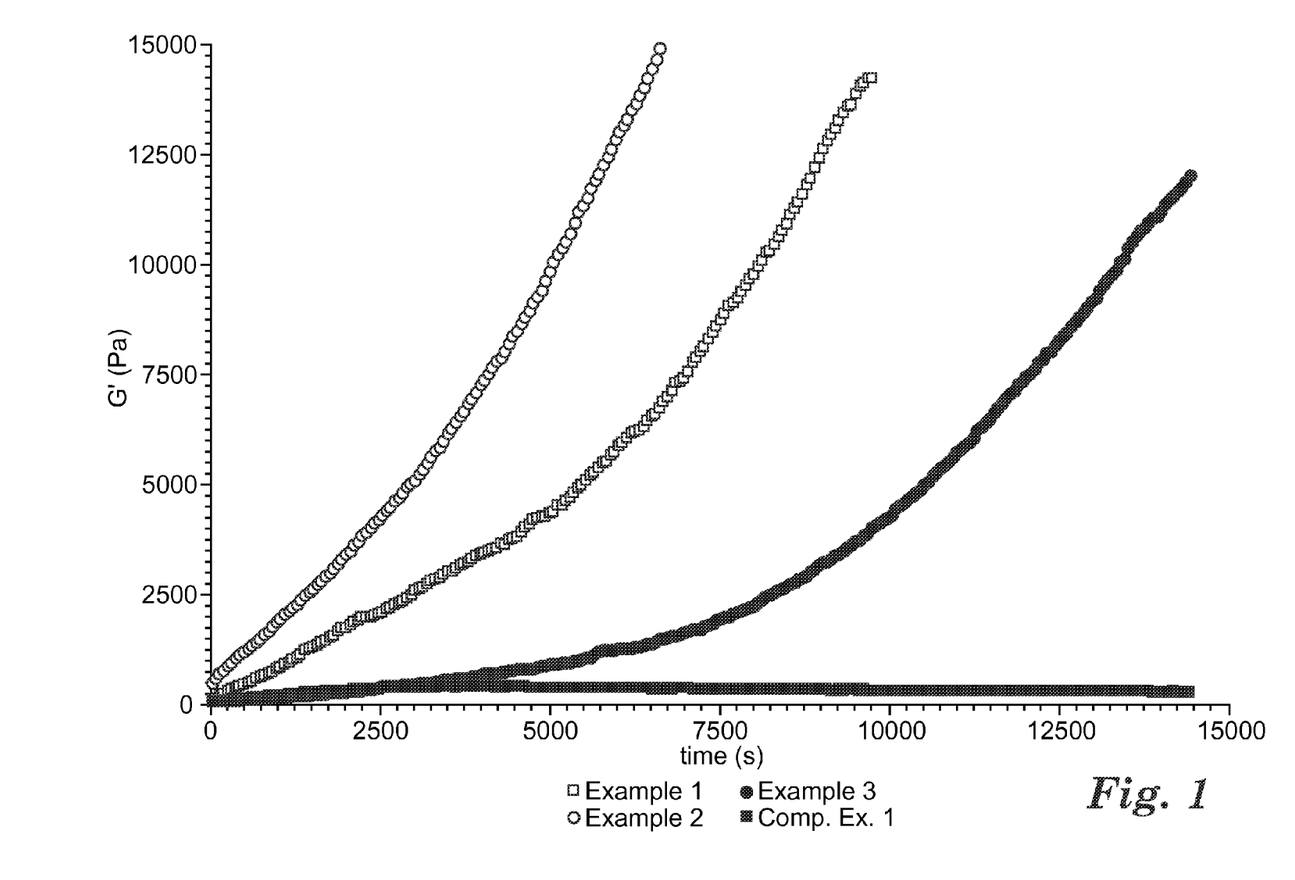
FIG. 1 is a graph of G' versus time for Comparative Example 1 and Examples 1-3.
Figure 2:
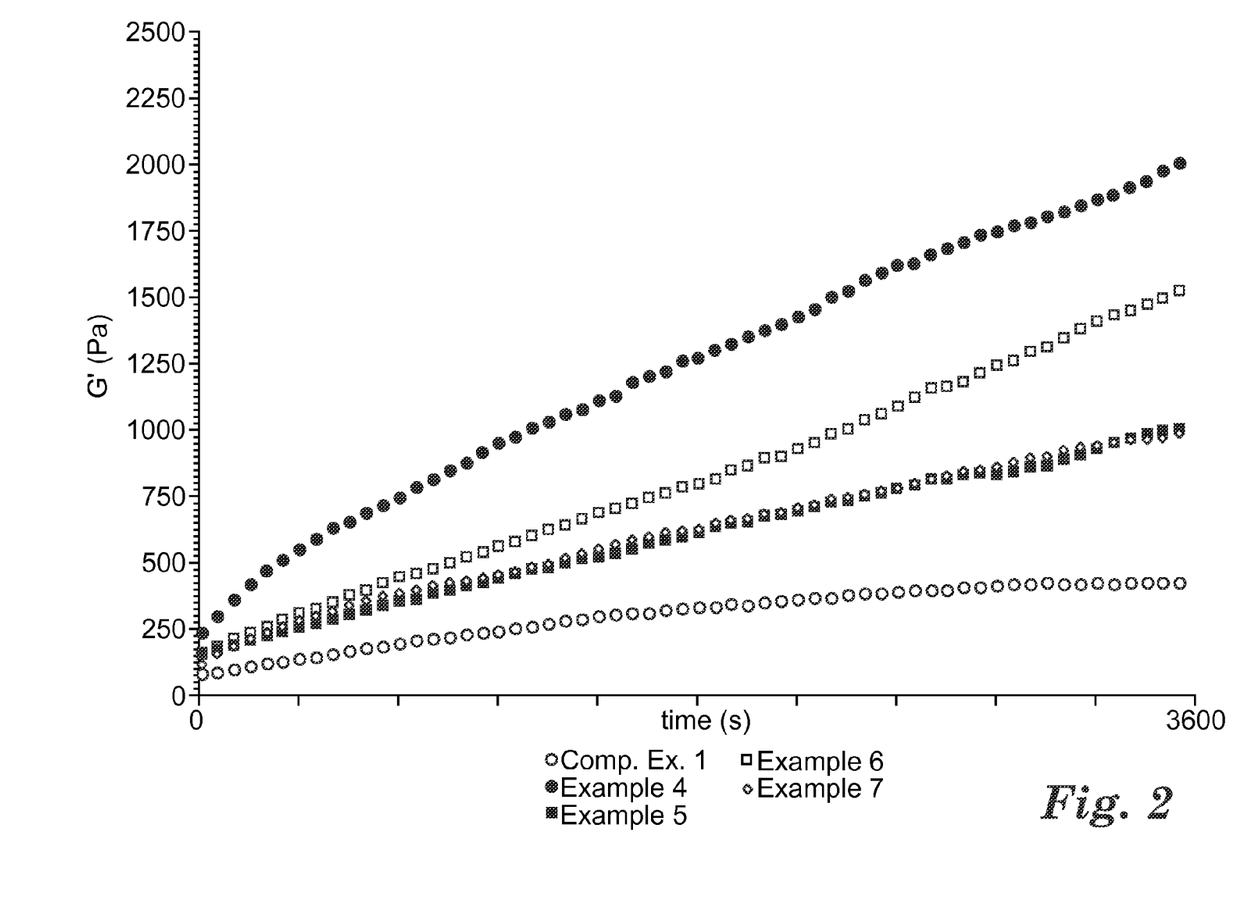
FIG. 2 is a graph of G' versus time for Comparative Example 1 and Examples 4-7.

Comparative Example 1 and Examples 1-7 were removed from the liner, loaded onto a rheometer probe and tested following the rheometer method above. Shown in FIG. 1 is a graph of G' versus time for Comparative Example 1 (Comp. Ex. 1) and Examples 1-3. Shown in FIG. 2 is a graph of G' versus time for Comparative Example 1 and Examples 4-7. As shown in FIGS. 1 and 2, the non-activated acetylenic functional polymer A comprising an azide curing agent showed a marked increase in modulus with time, indicating cross-linking.

Example 8

To 3.3 g of the non-activated acetylenic functional polymer B, 0.02 g of $N_3CH_2CH_2O[CH_2CH(CH_2N_3)O]_6CH_3$ was added. The sample was mixed, coated on liner, and air dried at room temperature for 24 hours.

Comparative Example 2 was prepared as Example 8 above, except no azide was added.

Example 9

To 1.6 g of the non-activated acetylenic functional polymer B, 1.6 g of the azide functional polymer was added. The sample was mixed, coated on a liner, and air dried at room temperature for 24 hours.

Example 10

The dual functional polymer comprising a non-activated acetylenic functional group and an azide functional group was coated onto a liner and air dried at room temperature for 24 hours.

Figure 3:
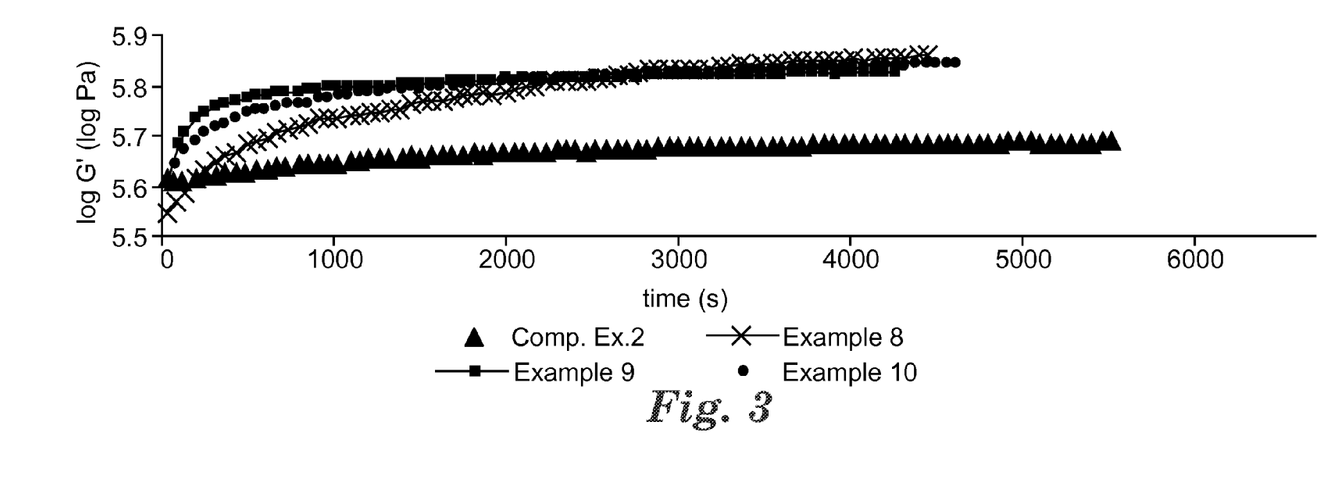
FIG. 3 is a graph of log G' versus time for Comparative Example 2 and Examples 8-10.

Examples 8, 9, and 10, and Comparative Example 2 were removed from the liner, loaded onto the rheometer probe and tested following the rheometer method above. Shown in FIG. 3 is a graph of log G' versus time for Comparative Example 2 (Comp. Ex. 2) and Examples 8, 9, and 10.

Example 11

To 3.3 g of the azide functional polymer, 0.02 g of tris propargyl trimesoate dissolved in 0.34 g ethyl acetate was added. The sample was mixed, coated on liner, and air dried at room temperature for 24 hours.

Comparative Example 3 was prepared as Example 11 above, except no tris propargyl trimesoate was added.

Example 12

To 3.3 g of the azide functional polymer, 0.01 g of tris propargyl trimesoate dissolved in 0.34 g ethyl acetate was added. The sample was mixed, coated on liner and air dried at room temperature for 24 hours.

Figure 4:
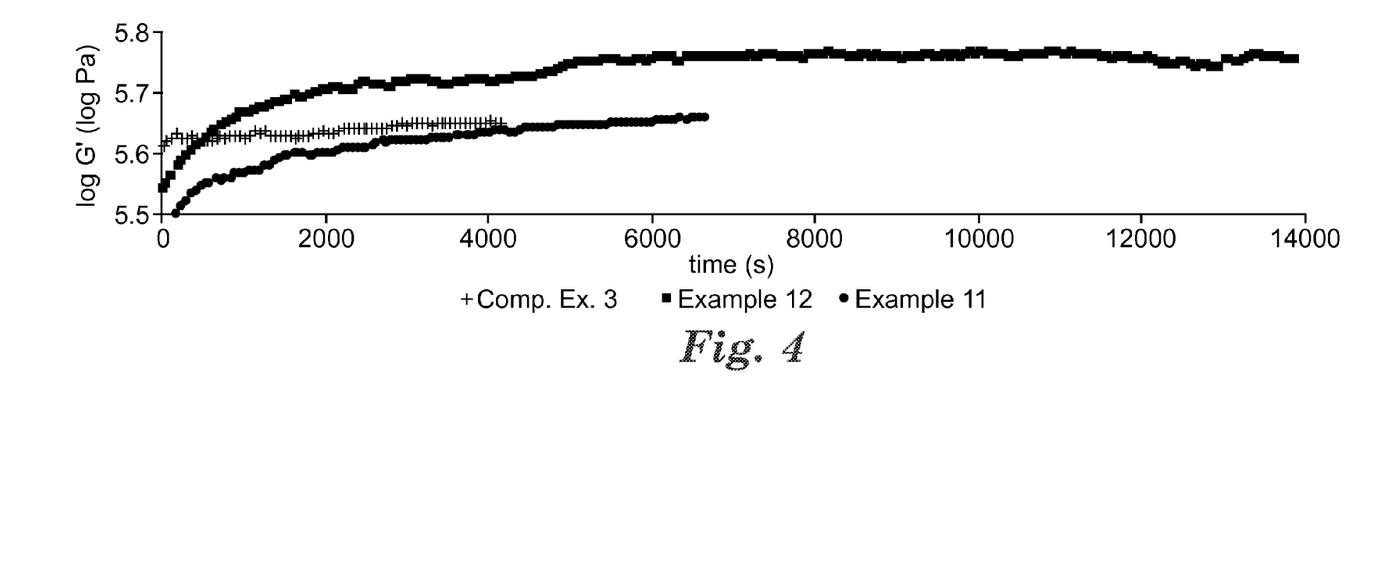
FIG. 4 is a graph of log G' versus time for Comparative Example 3 and Examples 11-12.

Examples 11 and 12 and Comparative Example 3 were removed from the liner, loaded onto the rheometer probe and tested following the rheometer method above. Shown in FIG. 4 is a graph of log G' versus time for Comparative Example 3 (Comp. Ex. 3) and Examples 11 and 12.

Example 13 was prepared as Example 1 except 0.02 grams of the azido-dye compound was added to 2.2 g of non-activated acetylenic functional polymer A. The sample was mixed, coated on liner, and air dried at room temperature for 24 hours. The sample was then heated at 160° C. in an oven for 2 hrs. The polymer was then washed with ethanol. The ethanol wash remained clear (i.e., the dye did not wash out of the polymer), indicating the dye was reacted into the polymer.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising:
  a. a substantially linear copolymer comprising at least two randomly distributed interpolymerized non-activated acetylene cure-site monomers; and
  b. a curing agent, wherein the curing agent comprises at least two azide groups, wherein the composition is substantially free of a metal catalyst.

2. The composition of claim 1 wherein the substantially linear copolymer comprises monomers of (meth)acrylate.

3. The composition of claim 1 wherein the substantially linear copolymer is a free radically polymerized polymer.

4. The composition of claim 1 wherein the substantially linear copolymer has a number average molecular weight (Mn) of at least 50,000 dalton.

5. The composition of claim 1 further comprising a compound, wherein the compound comprises a functional entity and at least one pendant non-activated acetylene group or azide group.

6. The composition of claim 5, wherein the functional entity is a dye.

7. The composition of claim 1, wherein the curing agent is a compound comprising a functional entity and at least two pendant non-activated acetylene groups or azide groups.

8. The composition of claim 1, wherein the composition is at least one of an adhesive and a coating.

9. A method comprising providing the composition as described in claim 1 and cross-linking the composition.

10. The method of claim 9, wherein the cross-linking is thermally activated.

11. An article comprising the composition as described claim 1, wherein the article is a filled polymer, a reinforced composite, or a structural article.

* * * * *

UNITED STATES PATENT AND TRADEMARK OFFICE
CERTIFICATE OF CORRECTION

PATENT NO.         : 8,445,601 B2
APPLICATION NO.    : 12/271222
DATED              : May 21, 2013
INVENTOR(S)        : Michael D Crandall Page 1 of 1

It is certified that error appears in the above-identified patent and that said Letters Patent is hereby corrected as shown below:

Title Page:
Column 2 (Other Publications); Line 3, Delete "Angewante" and insert -- Angewandte --, therefor.

In the Specification:
Column 6
Line 59, Delete "azidopropryl" and insert -- azidopropyl --, therefor.

Column 9
Line 25, Delete "azirdine" and insert -- aziridine --, therefor.

Column 14
Line 41, Delete "IR" and insert -- IR. --, therefor.
Line 53-54, Delete "anthroquinone" and insert -- anthraquinone --, therefor.
Line 57-58, Delete "anthroquinone" and insert -- anthraquinone --, therefor.
Line 63, Delete "filtrite" and insert -- filtrate --, therefor.

Column 15
Line 8, Delete "filtrite" and insert -- filtrate --, therefor.
Line 10, Delete "filtrite" and insert -- filtrate --, therefor.
Line 12, Delete "filtrite" and insert -- filtrate --, therefor.

In the Claims:
Column 19
Line 16, Claim 11, after "described" insert -- in --.

Signed and Sealed this
Seventeenth Day of September, 2013

Teresa Stanek Rea
*Deputy Director of the United States Patent and Trademark Office*